Jan. 24, 1956  E. T. NELSON  2,731,756
AUXILIARY SPINNING REEL
Filed June 15, 1953
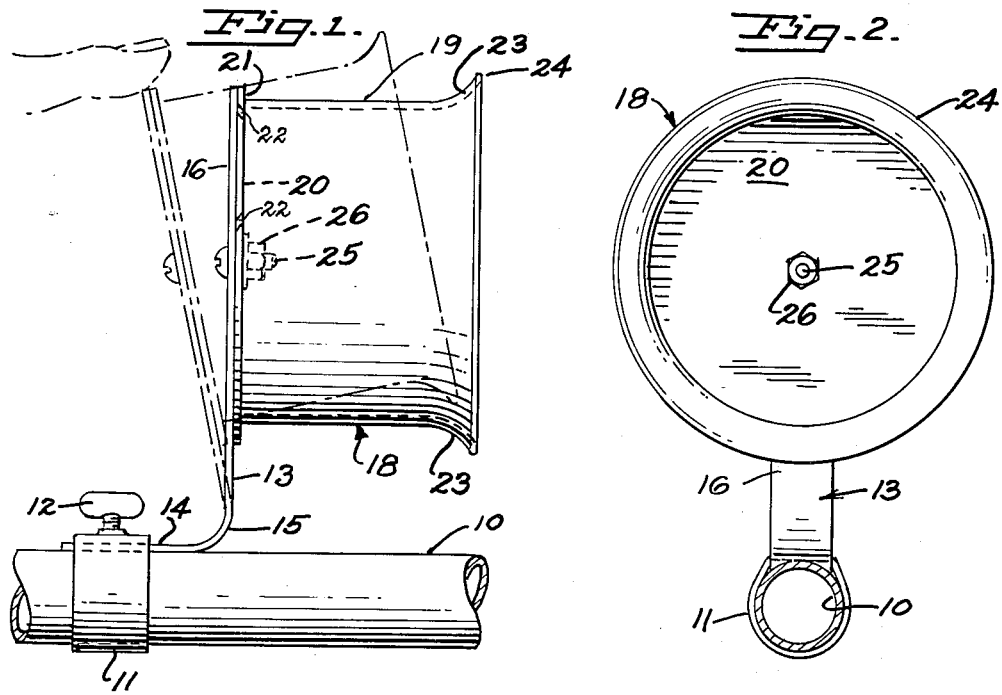
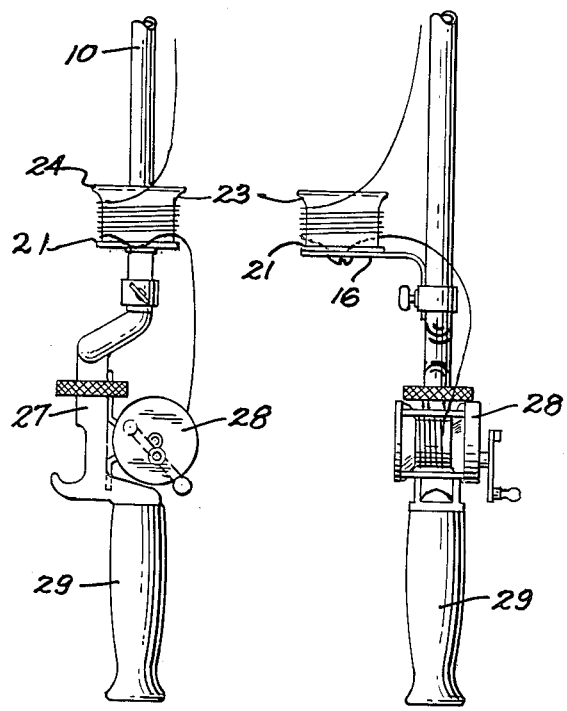
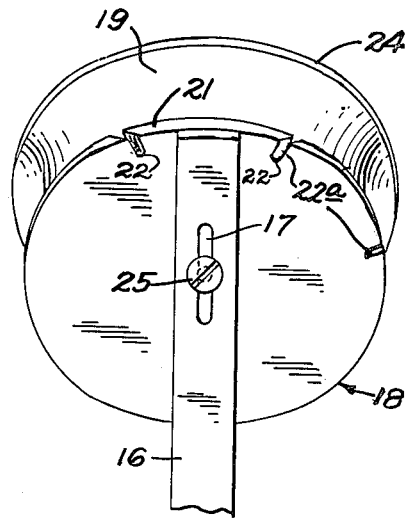
INVENTOR.
ELMER T. NELSON
BY
ATTORNEY

2,731,756
AUXILIARY SPINNING REEL

Elmer T. Nelson, San Francisco, Calif.

Application June 15, 1953, Serial No. 361,581

5 Claims. (Cl. 43—20)

This invention relates to auxiliary spinning reels of the type used on fishing rods, meaning thereby a reel mounted adjacent the handle of a fishing rod in addition to the conventional winding reel, and which pays out the fishing line during the cast of a line in a fishing operation.

Spinning reels are broadly well known in the art, but are expensive and rather intricate devices, usually combining facilities for freely casting a certain predetermined length of the fishing line, but also including facilities for rewinding the line on the reel.

The purpose and object of the present invention is to provide an inexpensive auxiliary spinning reel, simple in construction and use, the term "reel" being used in its broadest sense as including a spool upon which a line may be manually wound and freely payed out (meaning fed-out lengthwise) while preferably employing an ordinary standard reel, which may be inexpensive, for the play and landing of a fish if one be caught on the line, and for winding in the line.

Briefly, the auxiliary reel of the invention may be described as comprising a spool mounted upon one leg of a resilient angled bracket, the other leg of the bracket being for removable attachment to the fishing rod by means of a suitable clamp. The spool has a spindle or winding face portion which has at one end a substantially perpendicular rear flange for maintaining the several wraps of the fishing line within the length of the circumferential face of the spindle. The rear flange may also be manually engaged by a finger of the operator's hand for moving the spool rearwardly on the resilient bracket to facilitate winding of the line on the spindle. The spool has its opposite or front circumferential edge portion flared radially outwardly by an inclined face, preferably an arc of sufficient radius to provide a gradual incline from the spindle portion to the front edge thereof. The rear flange has radially cut slots in which may be lockingly engaged the end portion of the predetermined length of line which is to be wrapped upon the spool. Since the auxiliary reel of the invention is for cooperating use with a suitable winding reel of conventional type, it is mounted on the fishing rod adjacently forward of the handgrip and winding reel, and preferably positioned substantially offset at an angle of 90 degrees from alignment with the winding reel.

One form in which the invention may be embodied is described herein and illustrated in the accompanying drawing in which:

Fig. 1 is a side elevational view of the invention, an operational position being shown in broken lines;

Fig. 2 is a front view of the invention.

Fig. 3 is a perspective view of the rear of Fig. 2, the bracket being shown fragmentarily.

Fig. 4 is a top plan view of the invention mounted on a fishing rod, and

Fig. 5 is a view of the invention mounted on a fishing rod and positioned at 90 degree angle to the view shown in Fig. 4.

Referring to the drawing in which like reference characters indicate corresponding parts in the several views, 10 is a fishing rod upon which the auxiliary spinning reel is removably mounted by means of any suitable clamp member 11 which has a thumb screw 12 for securely but releasably mounting an angled bracket 13 of resilient spring steel strip relatively close to and forwardly of the handle and conventional winding reel. One relatively short leg 14 of the resilient bracket member 13 is held by the clamp in parallel contact along the fishing rod and is bent upon itself preferably in an arcuate bend 15 at substantially 90 degrees to provide the other leg 16 of the bracket which is preferably relatively longer and extends freely perpendicular to the short leg and to the fishing rod when the bracket is mounted thereon. Intermediate its ends and more nearly adjacent the free terminal end of the longer leg 16, the bracket is provided with a longitudinal slot 17, for adjustably mounting a spool 18, said longer leg being of sufficient length to space the circumference of the spool from the fishing rod, for example, about one inch.

The spool 18 is non-rotatively secured at one of its axial ends upon the free terminal end portion of the longer leg of the bracket so that when the bracket and spool are mounted on a fishing rod the axis of the spool is substantially parallel with the rod. The spool has a circumferential substantially cylindrical spindle or spool face 19 upon which a predetermined portion of the fishing line may be manually wound. The spool is preferably a hollow cup for reducing its weight and is closed at one end by an inner end wall 20 which is of greater diameter than the cylindrical spindle or spool face 19 and extends radially therebeyond to provide a substantially perpendicular flange 21, the circumferential edge of which has a plurality of relatively circumferentially spaced slots 22 radially cut therein substantially the depth of the flange, the relatively adjacent slots being cut at diverging angles so that if a fishing line is engaged in any two slots it will be frictionally engaged by the edges 22a which will, for practical purposes of casting, lock that portion of the line engaged in the slots, whereupon the free or loose portion of the line may be wound on the spindle or spool face. When the free portion of the line is payed out in the cast, the extent of the cast is limited by said free portion wound on the spool.

The opposite open end portion of the cup has its circumferential portion flared radially outwardly at an incline from the spindle or spool face 19, preferably as an arc 23, so that the circumferential edge 24 in the nature of a flange is of greater diameter than the spindle spool face 19. The spool is secured to the leg 16 of the bracket by means of a screw 25 which extends through slot 17 and through the inner end wall 20 and is engaged within the cup by nut 26. Thus, the spool may be adjusted longitudinally on the bracket leg 16, the bracket and spool being mountable on the rod whereby the axis of the spool is substantially parallel to the rod.

It is to be noted that a further important function of the rear flange 21 is that it provides an extended rim which may be engaged by a finger or thumb of the angler's rod-manipulating hand whereby the spool may be temporarily pulled rearwardly due to the resilience of the bracket 13 to the position shown in dotted lines in Fig. 1, whereby the space between the rod 10 and the front circumferential edge 24 of the spool is increased to facilitate winding of the line on the spool, since the spool and said circumferential edge 24 are normally preferred to be quite conveniently close to the pole.

The auxiliary reel is mounted adjacently forwardly relative to a reel seat 27 and winding reel 28 which are conventionally positioned closely forward of handgrip 29 of the fishing pole 10, the positioning of the winding reel and auxiliary reel being preferably relatively positioned out of alignment at 90 degrees spacing about the longitudinal axis of the fishing pole so that by a slight turn of the wrist of an operating fisherman either or both of the reels may be optionally positioned accessibly for manual manipulation with a minimum amount of interference of one reel with the other.

In the present practice of casting a fishing line, an angler, if he does not have an expensive and intricate so-called spinning reel, estimates the distance he desires to case, which may be assumed for the present example to be 20 feet, in which case he draws out approximately 20 feet of the line off the conventional winding reel 28, and endeavors to manipulate that length of free line by loops in his hand, and pays it out as he makes his cast. With the present invention, he locks the connected end of the free 20-foot portion of line through two of the oppositely converging slots 22 by passing the line therethrough and then winds the remainder of the free portion of line on the spindle of the spool face 19 of the auxiliary reel, except of course, that portion of the free terminal end of the line which passes through the guides and the end tip of the fishing rod. The portion which is wound upon the auxiliary reel spool is then free for casting. As the cast is made, the portion of the line which is wound on the spool is automatically payed out by unwinding due to the force or throw of the casting operation, since there is a fly or some suitable weight at the free terminal end of the line. As the line is payed out from the spool it unwinds in the inverse order of its winding on the spool, that is, in the order of the windings which were last wound being the first to pay out. As the line is payed out it slides easily and readily and with substantially no practical resistance over the inclined or arcuate portion 23 and from the front circumferential edge 24. If by chance a fish strikes the bait or is caught, it should be borne in mind that the fish will not have 20 feet of free line for manipulation or run, because the angler has estimated the distance that he desires to cast and the 20 feet of free line, when it is cast, extends through the space between the end of the pole and the spot on the water to which the cast is made. Therefore, if a fish strikes or is caught, the line is lifted free from the slots 22, and the line is then manipulable from the ordinary conventional reel 28.

Having thus described the invention, what is claimed as new and patentable is:

1. An auxiliary spinning reel for fishing rods comprising a resilient bracket mountable on a fishing rod, and when so mounted, having a leg extending outwardly from the rod, and a spool mounted at one of its axial ends on the bracket and having a spindle face about which a fishing line may be wound, said spool being mounted on the bracket fixed against rotation, said leg of the bracket being of sufficient length whereby the circumference of the spool may be spaced from the fishing rod, the spool and brackets being mountable on the rod whereby the axis of the spool is normally substantially parallel with the rod, and the resilience of the bracket providing for manual tipping of the axis of the spool to an angular position relative to the rod, whereby the space may be selectively increased between the circumferential forward edge of the spool and the rod on which the bracket and spool are mounted for facilitating winding of the fishing line on the spool.

2. In a fishing device, an auxiliary spinning reel having the elements of claim 1 and in which the spool is hollow and cup-like and has at each end of its said spindle face a radially outwardly extending flange.

3. A device of the character described, having the elements of claim 1, and in which said spool has at each end of its spindle face a radially outwardly extended flange, the flange at the mounted inner end of the spool having a plurality of relatively circumferentially spaced radial slots therein.

4. An auxiliary spinning reel for fishing rods having the elements of claim 1, and in which each end of the spindle face of the spool has a radially outwardly extended flange, the flange opposite the inner mounted end of the spool being inclined radially outwardly from the spindle face of the spool towards the circumferential free terminal edge of the spool and the rearward inner flange at the mounted end of the spool having radial slot means therein whereby the fishing line may be locked to the spool at a predetermined portion of its length.

5. A device of the character described having the elements of claim 1 and in which each of the opposite ends of the spool has a radially outwardly extended flange, one of the flanged ends of the spool being mounted to the bracket, and the flange at the opposite end of the spool being inclined arcuately radially outwardly from the spindle face of the spool towards the circumferential edge at said opposite end of the spool.

References Cited in the file of this patent

UNITED STATES PATENTS

| | | |
|---|---|---|
| 704,646 | Jury | July 15, 1902 |
| 1,971,000 | Field | Aug. 21, 1934 |
| 2,083,689 | Clifford | June 15, 1937 |
| 2,525,289 | Dunn | Oct. 10, 1950 |
| 2,613,046 | Redding | Oct. 7, 1952 |